(12) United States Patent
Kasagi et al.

(10) Patent No.: US 10,500,961 B2
(45) Date of Patent: Dec. 10, 2019

(54) FAILURE DETECTION DEVICE OF POWER CONVERTER AND VEHICLE

(71) Applicant: Honda Motor Co.,Ltd., Tokyo (JP)

(72) Inventors: Kosuke Kasagi, Saitama (JP); Jiro Fukui, Saitama (JP); Takuya Nomura, Saitama (JP); Tomoyo Matsumoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 38 days.

(21) Appl. No.: 15/678,124

(22) Filed: Aug. 16, 2017

(65) Prior Publication Data

US 2018/0065486 A1 Mar. 8, 2018

(30) Foreign Application Priority Data

Sep. 7, 2016 (JP) ................................ 2016-174427

(51) Int. Cl.
*B60L 3/00* (2019.01)
(52) U.S. Cl.
CPC .......... *B60L 3/003* (2013.01); *B60L 2240/36* (2013.01)
(58) Field of Classification Search
CPC ......... B60L 3/003; B60L 3/00; B60L 2240/36
USPC ...................................................... 701/30.6
See application file for complete search history.

(56) References Cited

U.S. PATENT DOCUMENTS

| 2014/0297081 A1* | 10/2014 | Asami | B60L 3/0061 |
| | | | 701/22 |
| 2016/0260650 A1* | 9/2016 | Taguchi | B60L 11/1803 |
| 2017/0268797 A1* | 9/2017 | Mowris | F24H 9/2071 |
| 2018/0345793 A1* | 12/2018 | Nishiyama | B60L 3/003 |

FOREIGN PATENT DOCUMENTS

| CN | 103707890 | 4/2014 |
| CN | 105424215 | 3/2016 |
| JP | H02254330 | 10/1990 |

(Continued)

OTHER PUBLICATIONS

"Office Action of Japan Counterpart Application," dated Jul. 31, 2018, with English translation thereof, p. 1-p. 11.

(Continued)

*Primary Examiner* — Yazan A Soofi
(74) *Attorney, Agent, or Firm* — JCIPRNET

(57) ABSTRACT

A power converter which can prevent an erroneous detection even when a flow rate of a refrigerant is low and a vehicle having the power converter mounted therein are provided. A first inverter circuit including: an element group constituted by six transistors; six diode temperature sensors at least one of which is provided for each transistor to detect a temperature of the transistor; and a high arm-side refrigerant flow passage and a low arm-side refrigerant flow passage in which a refrigerant for cooling the transistors flows is provided. In a failure detection device of the first inverter circuit, a failure determination member selects two diode temperature sensors among the plurality of diode temperature sensors, which detect temperatures of two adjacent transistors, as an adjacent sensor pair, and determines a failure of any one of the plurality of diode temperature sensors using detection values of the adjacent sensor pair.

13 Claims, 6 Drawing Sheets

(56) References Cited

FOREIGN PATENT DOCUMENTS

| JP | H06119068  | 4/1994  |
|----|------------|---------|
| JP | 2000181276 | 6/2000  |
| JP | 2001208617 | 8/2001  |
| JP | 2002347121 | 12/2002 |
| JP | 2004-257821| 9/2004  |
| JP | 2007202296 | 8/2007  |
| JP | 2008102413 | 5/2008  |
| JP | 2008294067 | 12/2008 |
| JP | 2009236457 | 10/2009 |
| JP | 201110480  | 1/2011  |
| JP | 2012210012 | 10/2012 |
| JP | 2015061391 | 3/2015  |
| JP | 2016101009 | 5/2016  |
| JP | 2016163535 | 9/2016  |

OTHER PUBLICATIONS

"Office Action of Japan Counterpart Application," dated Mar. 22, 2019, with English translation thereof, p. 1-p. 5.
"Office Action of China Counterpart Application", dated May 17, 2019, with English translation thereof, p. 1-p. 31.
"Office Action of Japan Counterpart Application," with English translation thereof, dated Sep. 24, 2019, pp. 1-8.

\* cited by examiner

FAILURE DETECTION DEVICE OF POWER CONVERTER AND VEHICLE

CROSS-REFERENCE TO RELATED APPLICATION

This application claims the priority benefit of Japan application serial no. 2016-174427, filed on Sep. 7, 2016. The entirety of the above-mentioned patent application is hereby incorporated by reference herein and made a part of this specification.

BACKGROUND OF THE INVENTION

Field of the Invention

The present invention relates to a failure detection device of a power converter and a vehicle with the same mounted therein. More specifically, the invention relates to a failure detection device that detects a failure of a temperature detection member and a vehicle with the same mounted therein, wherein the temperature detection member detects a temperature of a switching element mounted in a power converter.

Description of Related Art

Cars that run using motors such as hybrid cars, fuel-cell cars, and electric cars have become widespread in recent years. Such a car that runs using a motor has a voltage converter that boosts a voltage supplied from a battery, a power converter that converts a DC voltage that has been boosted by the voltage converter into an AC voltage and supplies the voltage to the motor, and the like, mounted therein. In addition, the voltage converter, the power converter, and the like are housed in a housing in which a water jacket for cooling down the devices is formed. A unit in which the voltage converter, the power converter, the housing, and the like are gathered is mounted in a vehicle as a power control unit (which may be abbreviated to a "PCU" hereinbelow).

A power converter includes a plurality of semiconductor chips which are formed by combining power semiconductor elements like insulated gate bipolar transistors (IGBTs), diodes, and reverse conducting IGBTs (RC-IGBTs), etc. In addition, since a high current flows in the power semiconductor elements, a temperature thereof significantly changes accordingly. For that reason, the semiconductor chips also include temperature sensors to detect temperatures. In addition, when such temperature sensors are provided, a failure detection device that detects failures of the temperature sensors is also provided in many cases (e.g., refer to Patent Literature 1).

With respect to a failure detection device of temperature sensors disclosed in Patent Literature 1, temperatures of respective chips are estimated using the temperature sensors provided for each of the chips, rises in temperatures of the chips are estimated using an output current and mapping, and a temperature of cooling water is estimated for each of the chips by using the temperatures of the chips and the rises in temperatures estimated for the chips. Then, the failure detection device calculates the absolute values of differences in temperatures of the cooling water that have been estimated for the chips, and determines that temperature sensors are normal when all the absolute values are equal to or lower than a predetermined threshold value, and determines that any one of the temperature sensors has failed when any one of the absolute values is higher than the threshold value.

PRIOR ART DOCUMENT

Patent Document

[Patent Document 1] Japanese Unexamined Patent Application Publication No. 2004-257821

SUMMARY OF THE INVENTION

However, with respect to the failure detection device of a power converter for the temperature sensors disclosed in Patent Literature 1, a flow rate of cooling water drops at an extremely low temperature, a significant temperature difference thus arising temporarily in the PCU. There is concern of erroneous detection that may occur when a failure is detected by comparing estimated temperatures of the cooling water as described above. In addition, in order to avoid erroneous detection in such a specific situation, increasing a threshold value that is used to determine a failure may be considered, but if this is done, there is a possibility of there being a difficulty in detecting a failure in normal times.

The present invention provides a failure detection device of a power converter that can prevent erroneous detection even when a flow rate of a refrigerant is low and a vehicle having the failure detection device of the power converter mounted therein.

(1) A power converter (e.g., a first inverter circuit 3 or a second inverter circuit 4 which will be described below) includes an element group constituted by a plurality of three or more switching elements (e.g., transistors UH1, UL1, VH1, VL1, WH1, and WL1 which will be described below); a plurality of temperature detection members (e.g., diode temperature sensors TUH1, TUL1, TVH1, TVL1, TWH1, and TWL1 which will be described below) at least one of which is provided for one of the plurality of switching elements to detect a temperature of each of the plurality of switching element; and a refrigerant flow passage (e.g., a high arm-side refrigerant flow passage 74 and a low arm-side refrigerant flow passage 75 which will be described below) in which a refrigerant for cooling the plurality of switching elements flows. A failure detection device (e.g., an ECU 6 which will be described below) of the power converter may be a failure determination member (e.g., an ECU 6 which will be described below) that selects two temperature detection members among the plurality of temperature detection members, which detect temperatures of two adjacent switching elements, as a pair of adjacent temperature detection members, and determines a failure of any one of the plurality of temperature detection members using detection values of the pair of adjacent temperature detection members.

(2) In this case, the failure determination member may calculate the absolute value of a difference between the detection values of the pair of adjacent temperature detection members, and determine a failure of any one of the plurality of temperature detection members when the absolute value exceeds a predetermined failure determination value.

(3) In this case, the failure determination member may determine that one of the pair of adjacent temperature detection members has failed when the absolute value exceeds the failure determination value.

(4) In this case, the element group may be divided into a high arm element group constituted by high arm switching elements (e.g., the transistors UH1, VH1, and WH1 which will be described below) provided in each of a plurality of phases and a low arm element group constituted by low arm switching elements (e.g., the transistors UL1, VL1, and WL1 which will be described below) provided in each of the plurality of phases. The refrigerant flow passage may include a high arm-side refrigerant flow passage (e.g., a high arm-side refrigerant flow passage 74 which will be described below) for cooling the plurality of high arm switching elements constituting the high arm element group and a low arm-side refrigerant flow passage (e.g., a low arm-side refrigerant flow passage 75 which will be described below) for cooling the plurality of low arm switching elements constituting the low arm element group. A difference between a flow rate of a refrigerant in the high arm-side refrigerant flow passage and a flow rate of the refrigerant in the low arm-side refrigerant flow passage may be greater than or equal to a predetermined flow rate. The failure determination member may include a high arm-side failure determination member that selects two temperature detection members among the plurality of temperature detection members, which detect temperatures of two adjacent high arm switching elements included in the high arm element group, as the pair of adjacent temperature detection members and determine a failure of any one of the pair of adjacent temperature detection members using detection values of the pair of adjacent temperature detection members, and a low arm-side failure determination member that selects two temperature detection members among the plurality of temperature detection members, which detect temperatures of two adjacent low arm switching elements included in the low arm element group, as the pair of adjacent temperature detection members and determine a failure of any one of the pair of adjacent temperature detection members using detection values of the pair of adjacent temperature detection members.

(5) In this case, the element group may be divided into a high arm element group constituted by high arm switching elements provided in each of a plurality of phases and a low arm element group constituted by low arm switching elements provided in each of the plurality of phases. The refrigerant flow passage may include a high arm-side refrigerant flow passage for cooling the plurality of high arm switching elements constituting the high arm element group and a low arm-side refrigerant flow passage for cooling the plurality of low arm switching elements constituting the low arm element group. The plurality of high arm switching elements may be provided near the high arm-side refrigerant flow passage in a predetermined phase order from an upstream side to a downstream side. The plurality of low arm switching elements may be provided near the low arm-side refrigerant flow passage in the same order as the phase order from a upstream side to a downstream side. A difference between a flow rate of a refrigerant in the high arm-side refrigerant flow passage and a flow rate of the refrigerant in the low arm-side refrigerant flow passage may be within a range of predetermined flow rates. The failure determination member may select two temperature detection members among the plurality of temperature detection members, which detect temperatures of a high arm switching element and a low arm switching element of the same phase, as the pair of adjacent temperature detection members and determine a failure of any one of the pair of adjacent temperature detection members using detection values of the pair of adjacent temperature detection members.

(6) In this case, when a state in which the absolute value exceeds the failure determination value continues for a predetermined period of time or longer, the failure determination member may determine that one of the plurality of temperature detection members has failed.

(7) A vehicle (e.g., a vehicle V which will be described below) includes the power converter, a motor (e.g., a motor M which will be described below) that drives drive wheels using power supplied from the power converter, the failure detection device (e.g., the ECU 6 which will be described below) described in one of (1) to (6), and an output restriction member (e.g., the ECU 6, the first inverter circuit 3, or the like which will be described below) that restricts an output of the motor when the failure detection device determines that one of the plurality of temperature detection members has failed.

(8) In this case, the vehicle may further include a failure notification member (e.g., a warning lamp 8 and the ECU 6 which will be described below) that notifies a driver of a failure when the failure detection device determines that one of the plurality of temperature detection members has failed.

(9) In this case, the failure determination member may determine a failure only when a rotation speed of the motor is within a predetermined normal range determined based on detection values of the plurality of temperature detection members.

(1) The failure detection device of the present invention is intended for a power converter which includes an element group constituted by a plurality of three or more switching elements, a plurality of temperature detection members for detecting a temperature of each switching element, and a refrigerant flow passage in which a refrigerant for cooling the plurality of switching elements flows, and detects a failure in the plurality of temperature detection members. This failure detection device selects two temperature detection members among the plurality of temperature detection members, which detect temperatures of two adjacent switching elements, as a pair of adjacent temperature detection members and determines a failure of any one of the plurality of temperature detection members using detection values thereof. For example, when a flow rate of a refrigerant is low in an extremely low temperature environment, a difference in temperatures of the plurality of switching elements may be significant, however, in the present invention, temperature detection members that detect temperatures of two adjacent switching elements whose difference is relatively small are selected as a pair of adjacent temperature detection members and a failure is determined using detection values thereof, and thereby an erroneous detection can be prevented even when a flow rate of a refrigerant is low.

(2) In the present invention, the absolute value of the difference of the detection values of the pair of selected adjacent temperature detection members is calculated, and when the absolute value exceeds a failure determination value, a failure of any one of the plurality of temperature detection members is determined. That is, since a failure of the temperature detection member can be detected through a calculation of the absolute values of the two detection values and a comparison of the absolute value and the failure determination value in the present invention, the failure can be determined causing a smaller amount of calculation than in the related art.

(3) In the present invention, when the absolute value of the difference between the detection values of the pair of selected adjacent temperature detection members exceeds the failure determination value as described above, any one of the pair of adjacent temperature detection members is determined to have failed. Accordingly, the number of failed temperature detection members can be reduced to two out of three or more.

(4) The failure detection device of the present invention is intended for a power converter in which the refrigerant flow passage includes: a high arm-side refrigerant flow passage for cooling the plurality of high aim switching elements constituting the high arm element group; and a low aim-side refrigerant flow passage for cooling the plurality of low arm switching elements constituting the low arm element group. The high arm-side refrigerant flow passage and the low arm-side refrigerant flow passage have a difference in flow rates of a refrigerant being greater than or equal to a predetermined flow rate. When there is a difference in flow rates of a refrigerant between the high arm-side and the low arm-side, a significant temperature difference arises between the switching elements of the high arm element group and the switching elements of the low arm element group, which may cause erroneous detection. With regard to this problem, failures are detected individually for the plurality of high arm switching elements that are regarded as having a relatively small temperature difference and the plurality of low arm switching elements that are regarded as having a relatively small temperature difference in the present invention, and thus the number of occasions of erroneous detection can be reduced even when a flow rate of a refrigerant is low and a temperature difference increases.

(5) The failure detection device of the present invention is intended for a power converter in which the refrigerant flow passage includes: a high arm-side refrigerant flow passage for cooling the plurality of high arm switching elements constituting the high arm element group; and a low arm-side refrigerant flow passage for cooling the plurality of low arm switching elements constituting the low arm element group. The high arm switching elements and the low arm switching elements are provided near the high arm-side refrigerant flow passage and the low arm-side refrigerant flow passage in the same phase order from an upstream side to a downstream side. The high arm-side refrigerant flow passage and the low arm-side refrigerant flow passage have a difference in flow rates of a refrigerant within a range of predetermined flow rates. In this case, it is considered that a high arm switching element and a low arm switching element of the same phase can easily be caused to have an identical temperature. With regard to this point, in the present invention, temperature detection members which detect temperatures of a high arm switching element and a low arm switching element of the same phase whose difference is considered to be relatively small are set as a pair of adjacent temperature detection members, a failure is detected using detection values thereof, and thus the number of occasions of erroneous detection can be reduced even when a flow rate of a refrigerant is low and a temperature difference increases.

(6) There are cases in which detection values of a temperature detection member may momentarily fluctuate in a considerable range due to noise. With regard to this problem, the failure detection device of the present invention determines a failure of any one of the plurality of temperature detection members when a state in which an absolute value exceeds a failure determination value continues for a predetermined period of time or longer. Accordingly, the number of occasions of erroneous detection caused when an absolute value calculated using detection values momentarily fluctuates in a considerable range due to noise can be reduced.

(7) A vehicle of the present invention restricts an output of a motor when the failure detection device determines that one of the plurality of temperature detection members has failed. Accordingly, it is possible to prevent a failure of a switching element of the power converter which may be caused by continuously driving the switching element using a detection value erroneously detected by the failed temperature detection member. In addition, when a flow rate of a refrigerant is low in an extremely low temperature environment as described above, erroneous detection easily occurs in a failure detection device of the related art, and thus a vehicle having such a failure detection device of the related art mounted therein may restrict an output of a motor due to erroneous detection in an extremely low temperature environment. On the contrary, the vehicle of the present invention has a failure detection device mounted therein which causes a small number of occasions of erroneous detection in an extremely low temperature environment, which thus can reduce a frequency of restricting an output of the motor in the extremely low temperature environment, and in which therefore the product quality can be improved.

(8) The vehicle of the present invention notifies a driver of a failure when the failure detection device determines that one of the plurality of temperature detection members has failed. Accordingly, it is possible to prompt the driver to repair the temperature detection member, and thus to prevent a switching element from failing as a result of a continuous use of the failing temperature detection member.

(9) The vehicle of the present invention determines a failure only when a rotation speed of the motor is within a predetermined normal range determined based on detection values of the plurality of temperature detection members. Here, a case in which a rotation speed of the motor is outside the normal range is assumed to be, for example, a case in which a rotation speed of the motor is low and a temperature of a switching element becomes higher during climbing of the vehicle, or the like. In the vehicle of the present invention, the number of occasions of erroneous detection can be reduced by detecting a failure of a temperature detection member of the power converter except for special situations in which generation of heat from a switching element tends to be higher than during a normal time.

DESCRIPTION OF THE EMBODIMENTS

<First Embodiment>

Figure 1:
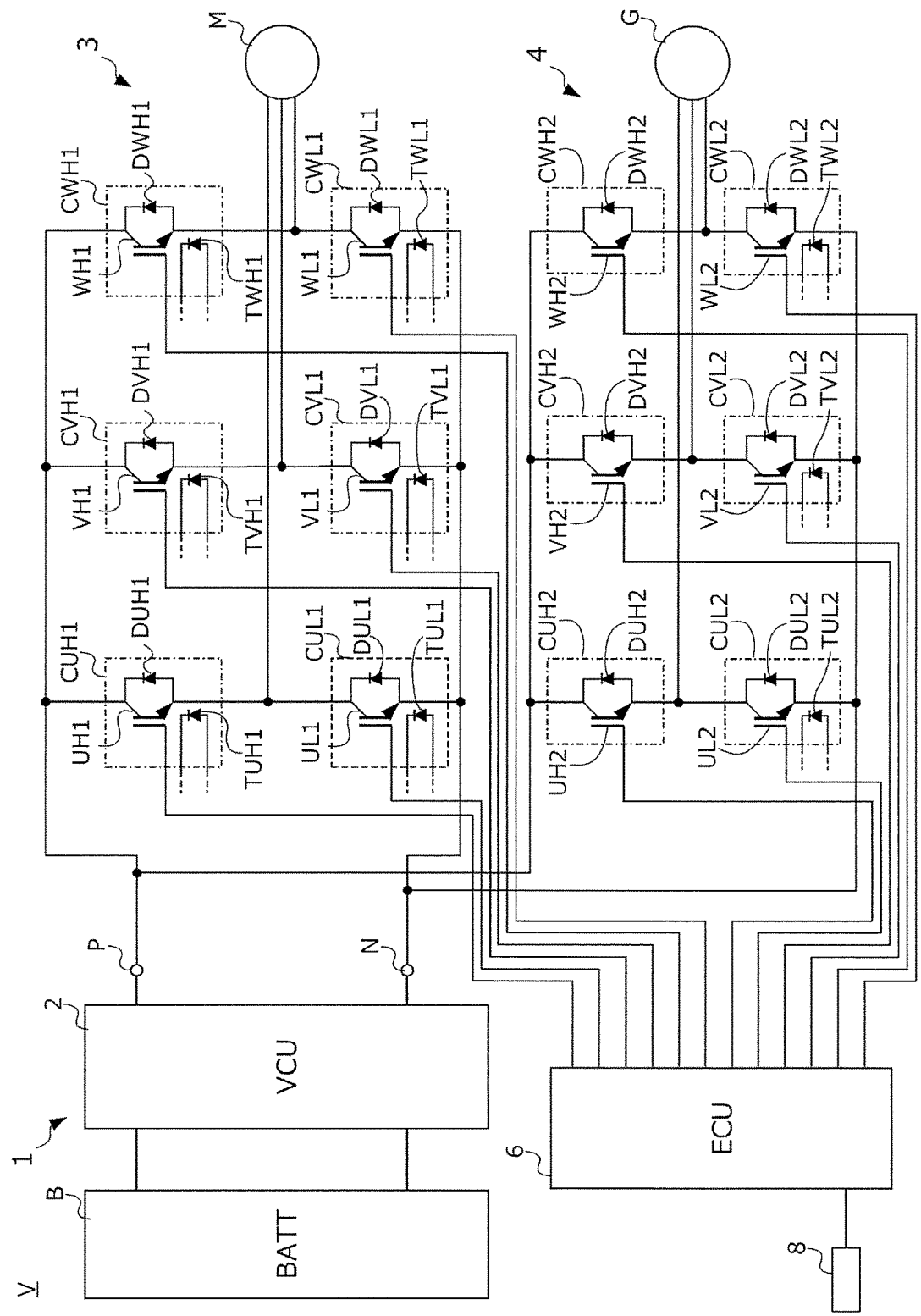
FIG. 1 is a diagram showing a circuit configuration of a vehicle and a power control unit thereof according to a first embodiment of the present invention.

A first embodiment of the present invention will be described with reference to the drawings. FIG. 1 is a diagram showing a circuit configuration of a vehicle V according to the present embodiment and a power control unit (which will be referred to as a "PCU" hereinbelow) 1 mounted in the vehicle V.

The vehicle V is a so-called hybrid vehicle, and includes an engine (not shown) that drives drive wheels (not shown), a generator G that serves as a motor driven by the output of the engine, a battery B that is a DC power source charged by the output of the generator G, a traction motor M (which will be referred to simply as a "motor" hereinbelow) that serves as a motor that drives the drive wheels using the power of the battery B, a PCU 1 that controls power exchange between the battery B, the generator G, and the motor M, and a warning lamp 8 that serves as a notification member that notifies a driver of the vehicle V of a failure of the PCU 1 by turning a light on.

The PCU 1 includes a voltage control unit (VCU) 2 that boosts a voltage supplied from the battery B or steps down a voltage to be supplied to the battery B, a first inverter circuit 3 that serves as a power converter that is connected between the VCU 2 and the motor M and converts a DC voltage into an AC voltage or converts an AC voltage into a DC voltage, a second inverter circuit 4 that serves as another power converter that is connected between the VCU 2 and the generator G and converts a DC voltage into an AC voltage or converts an AC voltage into a DC voltage, an electronic control unit (which will be abbreviated to an "ECU" hereinbelow) 6 that controls the VCU 2, the first inverter circuit 3, and the second inverter circuit 4, and a box-shaped housing 7 (refer to FIG. 2 which will be described below) that houses the above-described components.

The VCU 2 is a DC-DC converter constituted by a coil, a smoothing capacitor, a chopper circuit, and the like. The VCU 2 boosts a DC voltage supplied from the battery B according to a control signal from the ECU 6, supplies the voltage to the first inverter circuit 3, and thereby drives the motor M, or steps down a DC voltage supplied from the inverter circuit 3 or 4 at the time of a regenerative operation of the motor M or the generator G and supplies the voltage to the battery B.

The first inverter circuit 3 is a pulse width modulation (PWM) inverter based on pulse width modulation that includes bridge circuits in which, for example, transistors (e.g., IGBTs) that serve as a plurality of switching elements are connected by bridging. The first inverter circuit 3 is connected to a positive terminal P and a negative terminal N of the VCU 2, and connected to coils of a U phase, a V phase, and a W phase of the motor M.

The first inverter circuit 3 includes the bridge circuits configured with a high-side U-phase transistor UH1 and a low-side U-phase transistor UL1 that are connected in the U phase of the motor M, a high-side V-phase transistor VH1 and a low-side V-phase transistor VL1 that are connected in the V phase of the motor M, and a high-side W-phase transistor WH1 and a low-side W-phase transistor WL1 that are connected in the W phase of the motor M, and the transistors are connected by bridging in every phase. The six transistors UH1, UL1, VH1, VL1, WH1, and WL1 constitute an element group of the first inverter circuit 3. In addition, the element group is divided into a high arm element group constituted by the three transistors UH1, VH1, and WH1 and a low arm element group constituted by the three transistors UL1, VL1, and WL1. Each of the three transistors UH1, VH1, and WH1 of the high arm element group is connected to the positive terminal P of the VCU 2. In addition, each of the three transistors UL1, VL1, and WL1 of the low arm element group is connected to the negative terminal N of the VCU 2. Each pair of the transistors UH1 and UL1, the transistors VH1 and VL1, and the transistors WH1 and WL1 formed in each of the phases is connected to the VCU 2 in series.

Each of diodes DUH1, DUL1, DVH1, DVL1, DWH1, and DWL1 is connected between a collector and an emitter of each of the transistors UH1, UL1, VH1, VL1, WH1, and WL1 in a forward direction from the emitter to the collector. In addition, one of diode temperature sensors TUH1, TUL1, TVH1, TVL1, TWH1, and TWL1 which serve as temperature detection members for detecting temperatures of the transistors UH1, UL1, VH1, VL1, WH1, and WL1 is provided near each of the respective transistors for the one transistor.

The transistor UH1, the diode DUH1, and the diode temperature sensor TUH1 are integrated to be a module as a high-side U-phase semiconductor chip CUH1. The transistor UL1, the diode DUL1, and the diode temperature sensor TUL1 are integrated to be a module as a low-side V-phase semiconductor chip CVL1. The transistor VH1, the diode DVH1, and the diode temperature sensor TVH1 are integrated to be a module as a high-side V-phase semiconductor chip CVH1. The transistor VL1, the diode DVL1, and the diode temperature sensor TVL1 are integrated to be a module as a low-side V-phase semiconductor chip CVL1. The transistor WH1, the diode DWH1, and the diode temperature sensor TWH1 are integrated to be a module as a high-side W-phase semiconductor chip CWH1. In addition, the transistor WL1, the diode DWL1, and the diode temperature sensor TWL1 are integrated to be a module as a low-side W-phase semiconductor chip CWL1.

Each of gates of the transistors UH1, UL1, VH1, VL1, WH1, and WL1 is connected to the ECU 6 via a gate drive circuit that is not shown. In addition, each of anode electrodes and cathode electrodes of the diode temperature sensors TUH1, TUL1, TVH1, TVL1, TWH1, and TWL1 is connected to the ECU 6 via a temperature detection circuit that is not shown. Accordingly, the ECU 6 can measure temperatures of the transistors UH1, UL1, VH1, VL1, WH1, and WL1. Note that connections of the diode temperature sensors TUH1, TUL1, TVH1, TVL1, TWH1, and TWL1 with the ECU 6 are not shown in FIG. 1.

The second inverter circuit 4 is a pulse width modulation (PWM) inverter based on pulse width modulation that includes bridge circuits in which, for example, transistors (e.g., IGBTs) that serve as a plurality of switching elements are connected by bridging. The second inverter circuit 4 is connected to a positive terminal P and a negative terminal N of the VCU, and connected to coils of a U phase, a V phase, and a W phase of the generator G.

The second inverter circuit 4 includes the bridge circuits configured with a high-side U-phase transistor UH2 and a low-side U-phase transistor UL2 that are connected in the U phase of the generator G, a high-side V-phase transistor VH2 and a low-side V-phase transistor VL2 that are connected in the V phase of the generator G, and a high-side W-phase transistor WH2 and a low-side W-phase transistor WL2 that are connected in the W phase of the generator G, which are connected by bridging in every phase. The six transistors UH2, UL2, VH2, VL2, WH2, and WL2 constitute an element group of the second inverter circuit 4. In addition, the element group is divided into a high arm element group constituted by the three transistors UH2, VH2, and WH2 and a low arm element group constituted by the three transistors UL2, VL2, and WL2. Each of the three transistors UH2, VH2, and WH2 of the high arm element group is connected to the positive terminal P of the VCU 2. In addition, each of the three transistors UL2, VL2, and WL2 of the low arm element group is connected to the negative terminal N of the VCU 2. Each pair of the transistors UH2 and UL2, the transistors VH2 and VL2, and the transistors WH2 and WL2 formed in each of the phases is connected to the VCU 2 in series.

Each of diodes DUH2, DUL2, DVH2, DVL2, DWH2, and DWL2 is connected between a collector and an emitter of each of the transistors UH2, UL2, VH2, VL2, WH2, and WL2 in a forward direction from the emitter to the collector. In addition, one of the diode temperature sensors TUL2, TVL2, and TWL2 which serve as temperature detection members for detecting temperatures of the transistors UL2, VL2, and WL2, is provided near each of the respective transistors UL2, VL2, and WL2 for the one transistor.

The transistor UH2 and the diode DUH2 are integrated to be a module as a high-side U-phase semiconductor chip CUH2. The transistor UL2, the diode DUL2, and the diode temperature sensor TUL2 are integrated to be a module as a low-side U-phase semiconductor chip CUL2. The transistor VH2 and the diode DVH2 are integrated to be a module as a high-side V-phase semiconductor chip CVH2. The transistor VL2, the diode DVL2, and the diode temperature sensor TVL2 are integrated to be a module as a low-side V-phase semiconductor chip CVL2. The transistor WH2 and the diode DWH2 are integrated to be a module as a high-side W-phase semiconductor chip CWH2. In addition, the transistor WL2, the diode DWL2, and the diode temperature sensor TWL2 are integrated to be a module as a low-side W-phase semiconductor chip CWL2.

Each of gates of the transistors UH2, UL2, VH2, VL2, WH2, and WL2 is connected to the ECU 6 via a gate drive circuit that is not shown. In addition, each of anode electrodes and cathode electrodes of the diode temperature sensors TUL2, TVL2, and TWL2 is connected to the ECU 6 via a temperature detection circuit that is not shown. Accordingly, the ECU 6 can measure temperatures of the transistors UL2, VL2, and WL2. Note that connections of the diode temperature sensors TUL2, TVL2, and TWL2 with the ECU 6 are not shown in FIG. 1.

Figure 2:
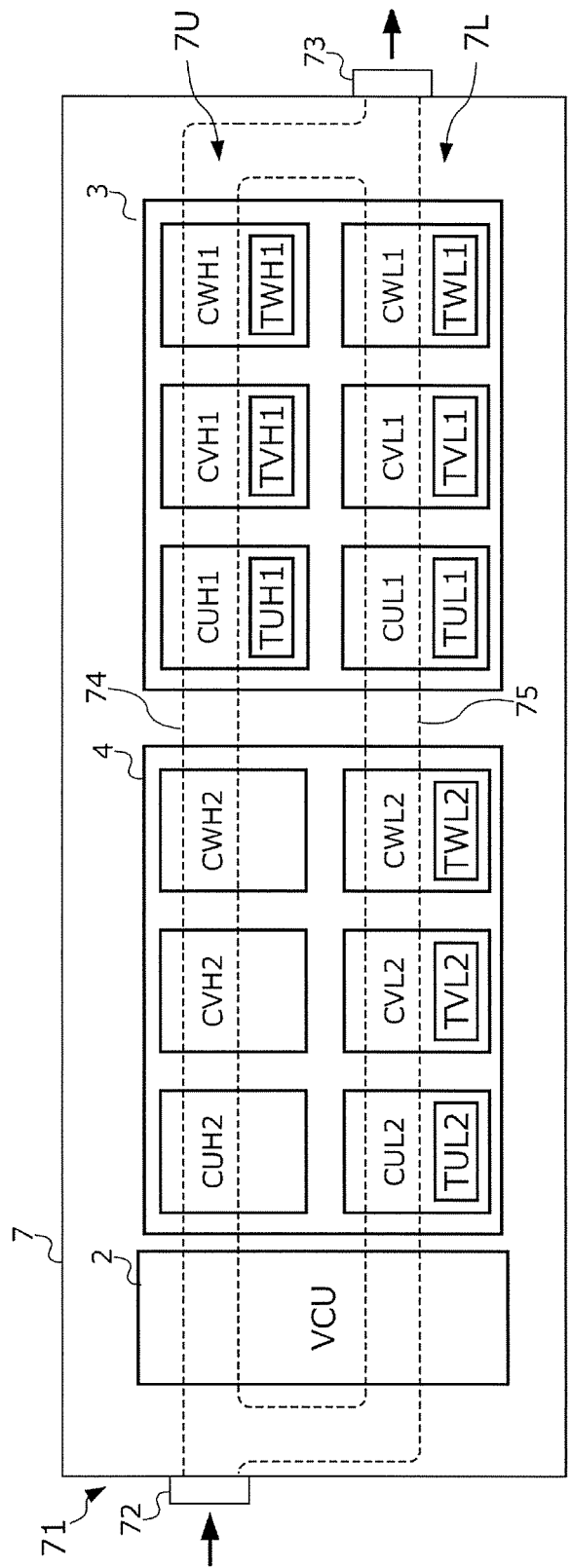
FIG. 2 is a schematic view showing an internal configuration of a housing of the power control unit.

Next, an internal configuration of the housing 7 of the PCU 1 will be described with reference to FIG. 2. FIG. 2 is a schematic view showing the internal configuration of the housing 7 of the PCU 1. The housing 7 includes the VCU 2, the second inverter circuit 4, and the first inverter circuit 3 therein in this order from the left side to the right side of FIG. 2.

When the internal part of the housing 7 is divided into an upper side 7U and a lower side 7L in its plan view as shown in FIG. 2, the high-side U-phase semiconductor chip CUH2, the high-side V-phase semiconductor chip CVH2, and the high-side W-phase semiconductor chip CWH2 of the second inverter circuit 4 are provided in the upper side 7U in this order from the left side to the right side of FIG. 2. In addition, the low-side U-phase semiconductor chip CUL2, the low-side V-phase semiconductor chip CVL2, and the low-side W-phase semiconductor chip CWL2 of the second inverter circuit 4 are provided in the lower side 7L in this order from the left side to the right side of FIG. 2.

Only the semiconductor chips CUL2, CVL2, and CWL2 among the six semiconductor chips CUH2, CUL2, CVH2, CVL2, CWH2, and CWL2 of the second inverter circuit 4 have diode temperature sensors TUL2, TVL2, and TWL2. The two semiconductor chips CUL2 and CVL2 are adjacent to each other making a pair, and the two semiconductor chips CVL2 and CWL2 are adjacent to each other making a pair as shown in FIG. 2.

In addition, the high-side U-phase semiconductor chip CUH1, the high-side V-phase semiconductor chip CVH1, and the high-side W-phase semiconductor chip CWH1 of the first inverter circuit 3 are provided in the upper side 7U in this order from the left side to the right side of FIG. 2. In addition, the low-side U-phase semiconductor chip CUL1, the low-side V-phase semiconductor chip CVL1, and the low-side W-phase semiconductor chip CWL1 of the first inverter circuit 3 are provided in the lower side 7L in this order from the left side to the right side of FIG. 2.

Each of the six semiconductor chips CUH1, CUL1, CVH1, CVL1, CWH1, and CWL1 of the first inverter circuit 3 has one of the diode temperature sensors TUH1, TUL1, TVH1, TVL1, TWH1, and TWL1. The two semiconductor chips CUH1 and CVH1 are adjacent to each other making a pair and the two semiconductor chips CVH1 and CWH1 are adjacent to each other making a pair in the high arm element group as shown in FIG. 2. In addition, the two semiconductor chips CUL1 and CVL1 are adjacent to each other making a pair and the two semiconductor chips CVL1 and CWL1 are adjacent to each other making a pair in the low arm element group. Furthermore, there are three pairs of chips with the same phase with an adjacent relationship, in addition to four pairs of chips in the same arm with an adjacent relationship in the element group of the first inverter circuit 3. That is, the two semiconductor chips CUH1 and CUL1 of the U phase are adjacent to each other making a pair, the two semiconductor chips CVH1 and CVL1 of the V phase are adjacent to each other making a pair, and the two semiconductor chips CWH1 and CWL1 of the W phase are adjacent to each other making a pair.

A water jacket 71, which cools the VCU 2, the second inverter circuit 4, and the first inverter circuit 3 using a refrigerant is provided on a lower surface side thereof inside the housing 7. The water jacket 71 has a substantially rectangular shape in a planar view, and includes a refrigerant introducing unit 72 that is provided at an end portion on the VCU 2 side, a refrigerant discharging unit 73 that is provided at an end portion of the first inverter circuit 3, and a high aim-side refrigerant flow passage 74 and a low arm-side refrigerant flow passage 75 through which the refrigerant introducing unit 72 and the refrigerant discharging unit 73 communicate with each other.

The high arm-side refrigerant flow passage 74 and the low arm-side refrigerant flow passage 75 are connected to the refrigerant introducing unit 72 and the refrigerant discharging unit 73 in parallel. Thus, a part of a refrigerant fed under pressure to the refrigerant introducing unit 72 by a pump, which is not shown, flows into the high arm-side refrigerant flow passage 74 and then is discharged from the refrigerant discharging unit 73, and the rest of the refrigerant flows into the low arm-side refrigerant flow passage 75 and then is discharged from the refrigerant discharging unit 73. Note that a case in which a difference between a flow rate of the refrigerant in the high arm-side refrigerant flow passage 74 and a flow rate of the refrigerant in the low arm-side refrigerant flow passage 75 is greater than or equal to a predetermined flow rate will be described in the present embodiment.

The high arm-side refrigerant flow passage 74 extends in the upper side 7U inside the housing 7 in the arrangement direction of the plurality of high-side semiconductor chips CUH2, CVH2, . . . of the first and second inverter circuits 3 and 4. Thus, the plurality of transistors constituting the high arm element groups of the first and second inverter circuits 3 and 4 provided in the plurality of high-side semiconductor chips CUH2, CVH2, . . . are cooled by the refrigerant flowing in the high arm-side refrigerant flow passage 74.

In addition, the low arm-side refrigerant flow passage 75 extends in the lower side 7L inside the housing 7 in the arrangement direction of the plurality of low-side semiconductor chips CUL2, CVL2, . . . of the first and second inverter circuits 3 and 4. Thus, the plurality of transistors constituting the low arm element groups of the first and second inverter circuits 3 and 4 provided in the plurality of low-side semiconductor chips CUL2, CVL2, . . . are cooled by the refrigerant flowing in the low aim-side refrigerant flow passage 75.

Next, a procedure of a temperature sensor failure detection process of detecting a failure in the six diode temperature sensors TUH1, TUL1, TVH1, TVL1, TWH1, and TWL1 provided in the first inverter circuit 3 and the three diode temperature sensors TUL2, TVL2, and TWL2 provided in the second inverter circuit 4 will be described.

Figure 3:
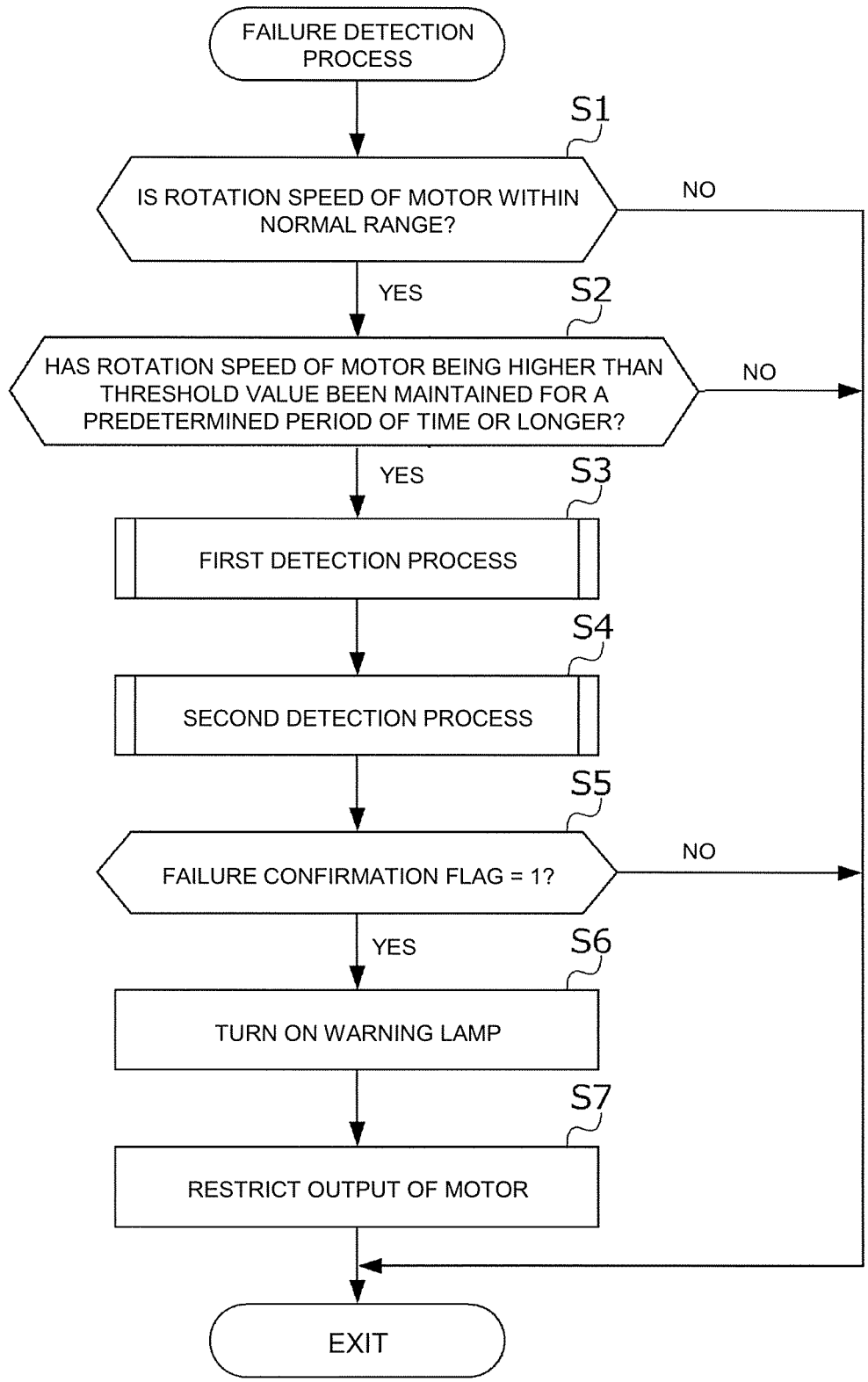
FIG. 3 is a flowchart showing a detailed procedure of a temperature sensor failure detection process.

FIG. 3 is a flowchart showing a detailed procedure of a temperature sensor failure detection process. The process shown in FIG. 3 is repeatedly executed by the ECU in every predetermined control cycle in accordance with an operation of a start switch that starts the vehicle.

First in S1, the ECU determines whether a current driving state of the vehicle is suitable for detecting a failure in the above-described diode temperature sensors. More specifically, the ECU determines whether a current rotation speed of the motor is within a predetermined normal range determined based on detection values of the six diode temperature sensors that are provided in the first inverter circuit. When the result of the determination of S1 is "YES," the process proceeds to S2, and when the result is "NO," the failure detection process of FIG. 3 ends without performing the following steps. Accordingly, the processes from S2 are performed except when a rotation speed of the motor is low when a temperature of the first inverter circuit becomes higher during climbing of the vehicle, or the like.

In S2, the ECU determines whether the rotation speed of the motor being higher than a predetermined threshold value has been maintained for a predetermined period of time or longer. When the result of the determination of S2 is "YES," the process proceeds to S3, and when the result is "NO," the failure detection process of FIG. 3 ends without performing the following steps. Accordingly, the processes from S3 can be performed when heating of the first inverter circuit becomes stable.

In S3, the ECU executes a first detection process of detecting a failure in the six diode temperature sensors provided in the first inverter circuit, and the process proceeds to S4.

Figure 4:
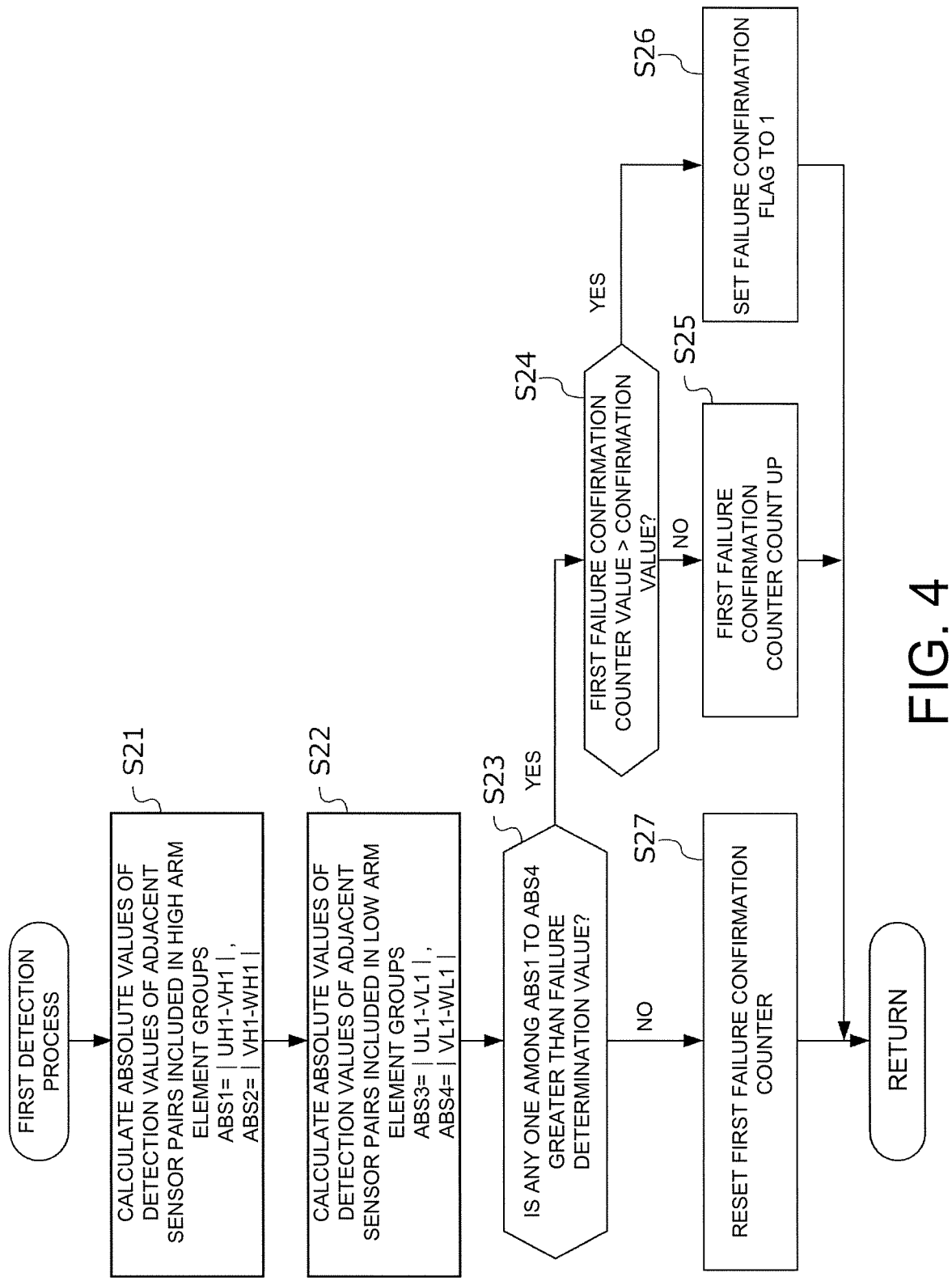
FIG. 4 is a flowchart showing a detailed procedure of a first detection process.

FIG. 4 is a flowchart showing a detailed procedure of the first detection process. As will be described below, two diode temperature sensors among the six diode temperature sensors TUH1, TUL1, TVH1, TVL1, TWH1, and TWL1 provided in the first inverter circuit, which detect temperatures of two adjacent transistors, are selected as a pair of adjacent sensors, and any failure in the six diode temperature sensors is determined using two detection values from the selected adjacent sensor pair in the first detection process.

There are the three pairs of chips with the same phase with an adjacent relationship, in addition to the four pairs of chips in the same arm with an adjacent relationship in the first inverter circuit as described above, and therefore, there are a total of seven pairs with an adjacent relationship. Here, in the PCU of the present embodiment, a difference between a flow rate of the refrigerant in the high arm-side refrigerant flow passage and a flow rate of the refrigerant in the low arm-side refrigerant flow passage is set to a predetermined flow rate. Thus, the chips in the different anus are considered to have a normal temperature difference. Therefore, in the first detection process of the present embodiment, a failure in the six diode temperature sensors is detected using the adjacent relationships of the four pairs of chips in the same arms out of the adjacent relationships of the seven pairs.

First in S21, the ECU calculates the absolute values of differences between detection values of pairs of adjacent sensors included in the high arm element group, and then proceeds to S22. More specifically, the ECU selects the diode temperature sensors TUH1 and TVH1 as a first adjacent sensor pair, and calculates the absolute value ABS1 of the difference between detection values from UH1 and VH1 (ABS1=|UH1−VH1|), and further selects the diode temperature sensors TVH1 and TWH1 as a second adjacent sensor pair, and then calculates the absolute value ABS2 of the difference between detection values from the VH1 and WH1 (ABS2=|VH1−WH1|).

In S22, the ECU calculates the absolute values of differences between detection values of adjacent sensor pairs in the low aim element group, and proceeds to S23. More specifically, the ECU selects the diode temperature sensors TUL1 and TVL1 as a third adjacent sensor pair, and calculates the absolute value ABS3 of the difference between detection values from UL1 and VL1 (ABS3=|UL1−VL1|), and further selects the diode temperature sensors TVL1 and TWL1 as a fourth adjacent sensor pair, and then calculates the absolute value ABS4 of the difference between detection values from the VL1 and WL1 (ABS4=|VL1−WL1|).

In S23, the ECU determines whether any one of the four calculated absolute values ABS1 to ABS4 is greater than a predetermined failure determination value. When the result of the determination of S23 is "YES," the ECU determines that there is a possibility of one of the temperature diode sensors having failed, and proceeds to S24. In S24, it is determined whether a value of a first failure confirmation counter is greater than a predetermined positive failure confirmation value. This first failure confirmation counter is a counter that measures a continuous time over which it is determined there is a possibility of any one of the diode temperature sensors of the first inverter circuit having failed in the determination of S23, and the counter counts up in S25, which will be described below, and is reset to 0 in S26, which will be described below.

When the result of the determination of S24 is "NO," the ECU adds the time that has elapsed from the previous control cycle to the current control cycle to the value of the first failure confirmation counter (see S25), and then the first detection process of FIG. 4 ends. When the result of the determination of S24 is "YES," that is, when a state in which any one of the four absolute values ABS1 to ABS4 is greater than the failure determination value has continued for a time corresponding to the failure confirmation value or longer, one of the adjacent sensor pairs used to calculate an absolute value exceeding the failure determination value is determined to have failed, a value of a failure confirmation flag is set to 1 (see S26), and the first detection process of FIG. 4 ends. In addition, when the result of the determination of S23 is "NO" the ECU determines that none of the six diode temperature sensors of the first inverter circuit has failed, resets the value of the first failure confirmation counter to 0, and thereby the first detection process of FIG. 4 ends.

Returning to FIG. 3, the ECU performs a second detection process of detecting a failure in the three diode temperature sensors provided in the second inverter circuit in S4, and proceeds to S5.

Figure 5:
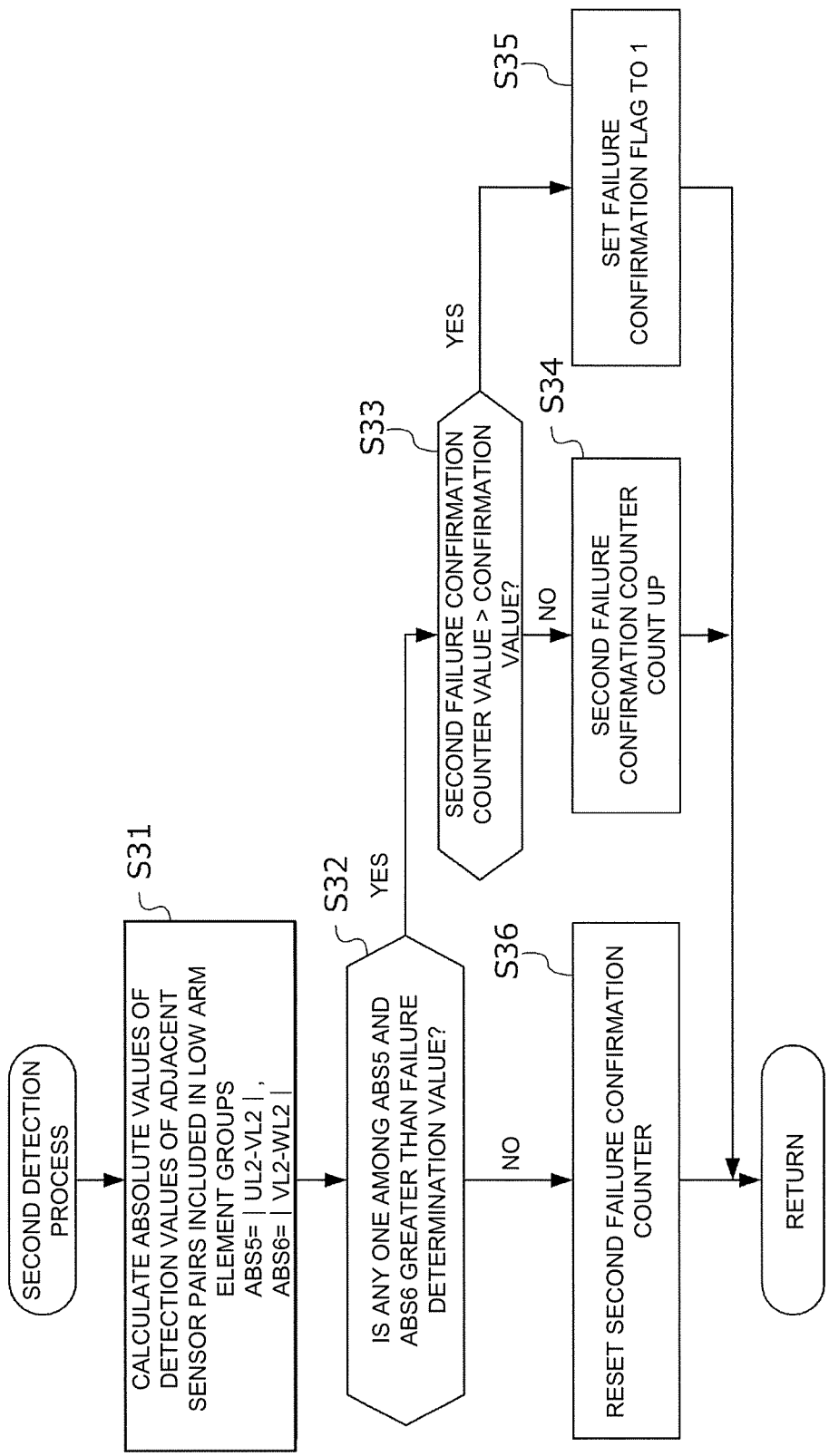
FIG. 5 is a flowchart showing a detailed procedure of a second detection process.

FIG. 5 is a flowchart showing a detailed procedure of the second detection process. In the second detection process, two adjacent sensors among the three diode temperature sensors TUL2, TVL2, and TWL2 provided in the second inverter circuit, which detect temperatures of two adjacent transistors, are selected as a pair of adjacent sensors, and a failure of any one of the three diode temperature sensors is determined using two detection values of the selected adjacent sensor pair as in the above-described first detection process. There are adjacent relationships for two pairs of chips in the low arm in the second inverter circuit as described above.

First in S31, the ECU calculates the absolute values of differences between detection values of adjacent sensor pairs included in the low arm element group, and then proceeds to S32. More specifically, the ECU selects the diode temperature sensors TUL2 and TVL2 as a fifth adjacent sensor pair, and calculates the absolute value ABS5 of the difference between detection values from UL2 and VL2 (ABS5=|HUL2−VL2|), and further selects the diode temperature sensors TVL2 and TWL2 as a sixth adjacent sensor pair, and then calculates the absolute value ABS6 of the difference between detection values from VL2 and WL2 (ABS6=|VL2−WL2|).

In S32, the ECU determines whether any one of the two calculated absolute values ABS5 and ABS6 is greater than a predetermined failure determination value. When the result of the determination of S32 is "YES," the ECU determines whether a value of a second failure confirmation counter is greater than a predetermined positive failure confirmation value (see S33). When the result of the determination of S33 is "NO," the ECU adds the time that has elapsed from the previous control cycle to the current control cycle to the value of the second failure confirmation counter (see S34), and then the second detection process of FIG. 5 ends. When the result of the determination of S33 is "YES," one of the adjacent sensor pairs used to calculate an absolute value exceeding the failure determination value is determined to have failed, a value of a failure confirmation flag is set to 1 (see S35), and the second detection process of FIG. 5 ends. In addition, when the result of the determination of S32 is "NO," the ECU determines that none of the three diode temperature sensors of the second inverter circuit has failed, resets the value of the second failure confirmation counter to 0, and thereby the second detection process of FIG. 5 ends.

Returning to FIG. 3, the ECU determines whether the failure configuration flag is 1 in S5. When the result of the determination of S5 is "NO," that is, when no failure in the total of nine diode temperature sensors of the first and second inverter circuits is determined, the failure detection process of FIG. 3 immediately ends without performing the following steps. When the result of the determination of S5 is "YES," that is, when a failure of any one of the nine diode temperature sensors is determined, the ECU proceeds to S6 and turns on the warning lamp to notify the driver of the fact that any one of the diode temperature sensors has failed. Further in S7, the ECU restricts a voltage or a frequency of the first inverter circuit to a predetermined value or lower in order to prevent a temperature of the first inverter circuit from excessively increasing with the failing one of the diode temperature sensors, thereby restricting an output of the motor, and then the failure detection process of FIG. 3 ends.

<Second Embodiment>

A vehicle of the second embodiment of the present invention and a power control unit thereof will be described below with reference to the drawings. Note that the same reference numerals are given to components the same as those in the vehicle of the first embodiment in the following description of the second embodiment, and description thereof will be omitted.

In the first embodiment, the case in which a difference between a flow rate of a refrigerant in the high arm-side refrigerant flow passage 74 and a flow rate of the refrigerant in the low arm-side refrigerant flow passage 75 is greater than or equal to a predetermined flow rate has been described with reference to FIG. 2. In the present embodiment, a case in which a flow rate of a refrigerant in the high arm-side refrigerant flow passage 74 and a flow rate of the refrigerant in the low arm-side refrigerant flow passage 75 are within a range of predetermined flow rates will be described. In this case, a procedure of a first detection process of detecting a failure in the six diode temperature sensors provided in the first inverter circuit 3 is different from that of the first embodiment.

Figure 6:
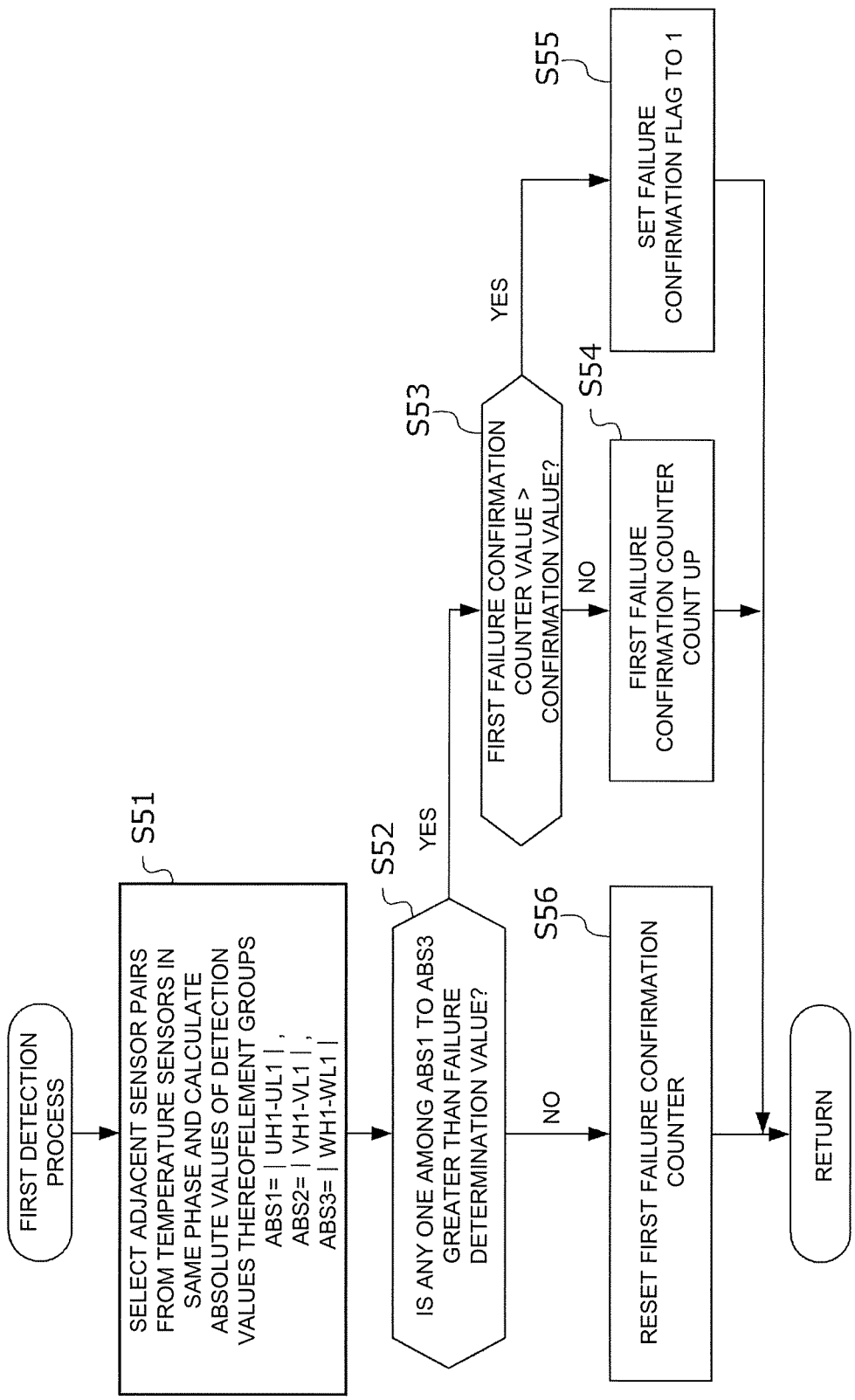
FIG. 6 is a flowchart showing a detailed procedure of a first detection process of a vehicle and a power control unit thereof according to a second embodiment of the present invention.

FIG. 6 is a flowchart showing a detailed procedure of a first detection process according to the present embodiment. The first inverter circuit 3 includes three pairs of chips with the same phase with an adjacent relationship in addition to four pairs of chips in the same arms with an adjacent relationship, and thus there are a total of seven adjacent relationships. When a difference between a flow rate of a refrigerant in the high arm-side refrigerant flow passage 74 and a flow rate of the refrigerant in the low arm-side refrigerant flow passage 75 is within a range of predetermined flow rates, a difference in temperature of the chips in the different arms is considered to be smaller than that of the first embodiment. In addition, each of the refrigerant flow passages 74 and 75 extends in an arrangement direction of the semiconductor chips of each arm. Thus, it is considered that temperatures of the semiconductor chips tend to become higher from an upstream side to a downstream side of the refrigerant flow passages 74 and 75. Thus, in a first detection process of the present embodiment, a failure in the six diode temperature sensors is detected using the adjacent relationships of the three pairs of chips with the same phases among the adjacent relationships of the seven pairs.

First in S51, the ECU selects adjacent sensor pairs of the U phase, the V phase, and the W phase, calculates the absolute values of differences in detection values in the three adjacent sensor pairs, and proceeds to S52. More specifically, the ECU selects the two diode temperature sensors TUH1 and TUL1 of the U phase as a first adjacent sensor pair and calculates the absolute value ABS1 of the difference between detection values from UH1 and UL1 (ABS1=|UH1−UL1|), selects the two diode temperature sensors TVH1 and TVL1 of the V phase as a second adjacent sensor pair and calculates the absolute value ABS2 of the difference between detection values from VH1 and VL1 (ABS2=|VH1−VL1|), and selects the two diode temperature sensors TWH1 and TWL1 of the W phase and calculates the absolute value ABS3 of the difference between detection values from WH1 and WL1 (ABS3=|WH1−WL1|).

In S52, the ECU determines whether any one of the three calculated absolute values ABS1 to ABS3 is greater than a predetermined failure determination value. When the result of the determination of S52 is "YES," the ECU determines whether a value of a first failure confirmation counter is greater than a predetermined positive failure confirmation value (see S53). When the result of the determination of S53 is "NO," the ECU adds the time that has elapsed from the previous control cycle to the current control cycle to the value of the first failure configuration counter (see S54), and then the first detection process of FIG. 6 ends. When the result of the determination of S53 is "YES," one of the adjacent sensor pairs used to calculate an absolute value exceeding the failure determination value is determined to have failed, a value of a failure confirmation flag is set to 1 (see S55), and the first detection process of FIG. 6 ends. In addition, when the result of the determination of S52 is "NO," the ECU determines that none of the six diode temperature sensors of the first inverter circuit has failed, resets the value of the first failure confirmation counter to 0, and thereby the first detection process of FIG. 6 ends.

What is claimed is:

1. A failure detection device of a power converter which includes: an element group constituted by a plurality of three or more switching transistors; a plurality of temperature detection sensors at least one of which is provided for one of the plurality of switching transistors to detect a temperature of each of the plurality of switching transistors; and a refrigerant flow passage in which a refrigerant for cooling the plurality of switching transistors flows, the failure detection device comprising:
    a failure determination electronic controller that selects two temperature detection sensors among the plurality of temperature detection sensors, which detect temperatures of two adjacent switching transistors, as a pair of adjacent temperature detection sensors, and determines a failure of any one of the plurality of temperature detection sensors using detection values of the pair of adjacent temperature detection sensors.

2. The failure detection device of the power converter according to claim 1, wherein the failure determination electronic controller calculates the absolute value of a difference between the detection values of the pair of adjacent temperature detection sensors, and determines a failure of any one of the plurality of temperature detection sensors when the absolute value exceeds a predetermined failure determination value.

3. The failure detection device of the power converter according to claim 2, wherein the failure determination electronic controller determines that one of the pairs of adjacent temperature detection sensors has failed when the absolute value exceeds the failure determination value.

4. The failure detection device of the power converter according to claim 2,
    wherein the element group is divided into a high arm element group constituted by high arm switching transistors provided in each of a plurality of phases and a low arm element group constituted by low arm switching transistors provided in each of the plurality of phases,
    the refrigerant flow passage includes a high arm-side refrigerant flow passage for cooling the plurality of high arm switching transistors constituting the high arm element group and a low arm-side refrigerant flow passage for cooling the plurality of low arm switching transistors constituting the low arm element group,
    a difference between a flow rate of a refrigerant in the high arm-side refrigerant flow passage and a flow rate of the refrigerant in the low arm-side refrigerant flow passage is greater than or equal to a predetermined flow rate, and
    the failure determination electronic controller includes:
a high arm-side failure determination electronic controller that selects two temperature detection sensors among the plurality of temperature detection sensors, which detect temperatures of two adjacent high arm switching transistors included in the high arm element group, as the pair of adjacent temperature detection sensors and determines a failure of any one of the pair of adjacent temperature detection sensors using detection values of the pair of adjacent temperature detection sensors, and
a low arm-side failure determination electronic controller that selects two temperature detection sensors among the plurality of temperature detection sensors, which detect temperatures of two adjacent low arm switching transistors included in the low arm element group, as the pair of adjacent temperature detection sensors and determines a failure of any one of the pair of adjacent temperature detection sensors using detection values of the pair of adjacent temperature detection sensors.

5. The failure detection device of the power converter according to claim 2,
    wherein the element group is divided into a high arm element group constituted by high arm switching transistors provided in each of a plurality of phases and a low arm element group constituted by low arm switching transistors provided in each of the plurality of phases,
    the refrigerant flow passage includes a high arm-side refrigerant flow passage for cooling the plurality of high arm switching transistors constituting the high arm element group and a low arm-side refrigerant flow passage for cooling the plurality of low arm switching transistors constituting the low arm element group,
    the plurality of high arm switching transistors are provided near the high arm-side refrigerant flow passage in a phase order predetermined from an upstream side to a downstream side,
    the plurality of low arm switching transistors are provided near the low arm-side refrigerant flow passage in the same order as the phase order from a upstream side to a downstream side,
    a difference between a flow rate of a refrigerant in the high arm-side refrigerant flow passage and a flow rate of the refrigerant in the low arm-side refrigerant flow passage is within a range of predetermined flow rates, and
    the failure determination electronic controller selects two temperature detection sensors among the plurality of temperature detection sensors, which detect temperatures of a high arm switching transistor and a low arm switching transistor of the same phase, as the pair of adjacent temperature detection sensors and determines a failure of any one of the pair of adjacent temperature detection sensors using detection values of the pair of adjacent temperature detection sensors.

6. The failure detection device of the power converter according to claim 2, wherein, when a state in which the absolute value exceeds the failure determination value continues for a predetermined period of time or longer, the failure determination electronic controller determines that one of the plurality of temperature detection sensors has failed.

7. The failure detection device of the power converter according to claim 3, wherein, when a state in which the absolute value exceeds the failure determination value continues for a predetermined period of time or longer, the failure determination electronic controller determines that one of the plurality of temperature detection sensors has failed.

8. The failure detection device of the power converter according to claim 4, wherein, when a state in which the absolute value exceeds the failure determination value continues for a predetermined period of time or longer, the failure determination electronic controller determines that one of the plurality of temperature detection sensors has failed.

9. The failure detection device of the power converter according to claim 5, wherein, when a state in which the absolute value exceeds the failure determination value continues for a predetermined period of time or longer, the failure determination electronic controller determines that one of the plurality of temperature detection sensors has failed.

10. A vehicle comprising:
   a power converter comprising a failure detection device, wherein the failure detection device comprises a failure determination electronic controller that selects two temperature detection sensors among a plurality of temperature detection sensors of the power converter, which detect temperatures of two adjacent switching transistors of the power converter, as a pair of adjacent temperature detection sensors, and determines a failure of any one of the plurality of temperature detection sensors using detection values of the pair of adjacent temperature detection sensors;
   a motor that drives a drive wheel using power supplied from the power converter; and
   an output restriction electronic controller that restricts an output of the motor when the failure detection device determines that one of the plurality of temperature detection sensors has failed.

11. The vehicle according to claim 10, further comprising:
   a failure notification member that notifies a driver of a failure when the failure detection device determines that one of the plurality of temperature detection sensors has failed.

12. The vehicle according to claim 10, wherein the failure determination electronic controller determines a failure only when a rotation speed of the motor is within a predetermined normal range determined based on detection values of the plurality of temperature detection sensors.

13. The vehicle according to claim 11, wherein the failure determination electronic controller determines a failure only when a rotation speed of the motor is within a predetermined normal range determined based on detection values of the plurality of temperature detection sensors.

* * * * *